United States Patent [19]

Recher et al.

[11] Patent Number: 5,032,139

[45] Date of Patent: Jul. 16, 1991

[54] PROCESS FOR DECORATING ARTICLES

[75] Inventors: Gilles Recher; Jean-Pierre Nurit, both of Annecy, France

[73] Assignee: Salomon, S.A., Annecy Cedex, France

[21] Appl. No.: 249,771

[22] Filed: Sep. 26, 1988

[30] Foreign Application Priority Data

Sep. 25, 1987 [FR] France ............................... 87 13552

[51] Int. Cl.[5] ............................................ B29B 11/00

[52] U.S. Cl. ........................................ 8/471; 156/249; 428/203

[58] Field of Search ........................... 8/471, 467, 468; 156/71, 99, 100, 230, 240, 235, 237, 249, 298; 428/40, 46, 203, 204, 205, 352, 354, 343, 412, 287; 52/171; 264/79

[56] References Cited

U.S. PATENT DOCUMENTS

| | | | |
|---|---|---|---|
| 3,897,587 | 7/1975 | Molner | 156/235 |
| 3,952,131 | 4/1976 | Sideman | 156/240 |
| 4,059,471 | 11/1977 | Haigh | 428/204 |
| 4,284,456 | 8/1981 | Hare | 156/235 |
| 4,395,263 | 7/1983 | Davis | 8/471 |
| 4,673,609 | 6/1987 | Hill | 52/171 |
| 4,824,722 | 4/1989 | Jarrett | 428/287 |

FOREIGN PATENT DOCUMENTS

| | | | |
|---|---|---|---|
| 1944905 | 5/1971 | Fed. Rep. of Germany . | |
| 2387793 | 11/1978 | France . | |
| 2457777 | 12/1980 | France . | |
| 2000730 | 1/1979 | United Kingdom . | |

*Primary Examiner*—2
*Assistant Examiner*—Louis Falasco
*Attorney, Agent, or Firm*—Sandler, Greenblum & Bernstein

[57] ABSTRACT

A process for decorating an article using a sublimation process includes the step of preparing a cover sheet having at least two superposed layers of plastic material, one of which is substantially transparent and the other which is opaque. A carrier sheet is prepared carrying a motif in the form of sublimable coloring agents. The carrier sheet is applied to the opaque layer of the cover sheet and a sublimation transfer process is effected by which the motif in the carrier sheet is transferred to the opaque layer of the cover sheet such that the coloring agents migrate into and beyond the opaque layer. Finally, the process involves applying the cover sheet to the article such that the opaque side of the cover sheet faces the article so that an observer views the motif through the transparent layer.

41 Claims, 4 Drawing Sheets

PROCESS FOR DECORATING ARTICLES

BACKGROUND OF THE INVENTION

1. Field of the Invention

This invention relates to a process for decorating articles, and more particularly to a process that utilizes a sublimation transfer process; and to articles produced by such process.

2. Related Subject Matter

The subject matter disclosed in this application is related to subject matter disclosed in copending Application Ser. No. 07/249,773 filed Sept. 26, 1988.

3. Discussion of Background and Relevant Information

The process of the present invention is concerned with stratified or multilayered non-textile articles. Non-limiting examples of such articles are skis, tables, sailboards, decorative panels, and base plates for cross-country ski bindings.

A transfer printing process using sublimable colors for printing on synthetic textile materials is described in French Patent No. 1,223,330. French Patent No. 2,387,793, describes coloring various non-textile articles such as wood, plastic, etc. by a sublimation transfer process. Such process comprises preparing a unitary layered element comprising a binding layer containing a pigment superimposed on a transparent layer, both layers being constituted by a hydrophobic polymer. The sublimation printing occurs on the transparent layer.

According to the '793 French patent, ink is inserted into the transparent layer to a depth of approximately 0.1mm beneath the surface of this layer. The pattern or motif defined by the ink is made visible because of the contrast between the ink and the pigmented layer.

The major disadvantage of this printing technique is its sensitivity to mechanical shock, and its degradation by exterior agents. In such cases, the motif is rapidly altered because the coloring agents, which are present only in a limited thickness of the layer, are progressively eroded and very quickly may be totally eliminated. Thus, long term retention of the printing is not likely to be achieved.

A sublimation transfer to a varnish layer coating of an object to be decorated is also known. Once the printing has been performed, another layer of varnish and/or lacquer is applied to the surface. The same disadvantages relating to the alteration of the printing with time is also encountered with this technique. Furthermore, multiple operations are necessary resulting in a substantial increase in manufacturing time and material used thereby reducing productivity and increasing costs.

It is therefore an object of the present invention to provide a new and improved process for decorating articles of the type described which overcomes the disadvantages of conventional processes.

SUMMARY OF THE INVENTION

The present invention provides a process for decorating an article using a sublimation printing process including steps of preparing a cover sheet having at least two superposed layers of plastic material, one of which is substantially transparent and has a thickness $e_1$, and the other of which is opaque and has a thickness $e_2$. A carrier sheet is prepared carrying a motif or pattern in the form of sublimable coloring agents. The carrier sheet is applied to the opaque layer of the cover sheet; and a sublimation transfer is made of the motif to the opaque layer of the cover sheet under controlled conditions of temperature T, pressure p, and time duration t such that the color agents migrate into the opaque layer. Afterwards, the cover sheet is applied to the article. Preferably the application of the cover sheet to the article is such that the opaque side faces the article and the transparent side faces the viewer so that the motif is visible through the transparent layer.

In the preferred form of the invention, the sublimation transfer of the coloring agents is effected such that the coloring agents migrate into the substantially transparent layer.

In one aspect of the invention, $e_1$ is greater than $e_2$; and in another aspect of the invention $e_1$ is less than $e_2$.

The substantially opaque layer may be a polyamide, and may be colored white by the incorporation of a suitable pigment thereinto.

The sublimation printing process can be carried out under conditions in which the temperature T is in the range of about 130° C. to 300° C., under conditions of pressure in the range of about 0.3 bar to 6 bar, and under conditions of time which is in the range of about a few seconds to a few minutes. In the preferred form of the invention, the temperature T is approximately 160° C., the pressure p is approximately 1 bar, and the time t is approximately 3 minutes.

The thicknesses of the layers in the cover sheet are selected such that $e_2$ is in the range of about 0.1mm to 0.3mm while $e_1$ is in the range of about 0.5mm to 0.8mm.

Finally, the invention also consists in an article decorated by the process described above.

BRIEF DESCRIPTION OF THE DRAWINGS

Embodiments of the present invention are shown in the accompanying drawings wherein.

DESCRIPTION OF PREFERRED EMBODIMENT

Figure 1:
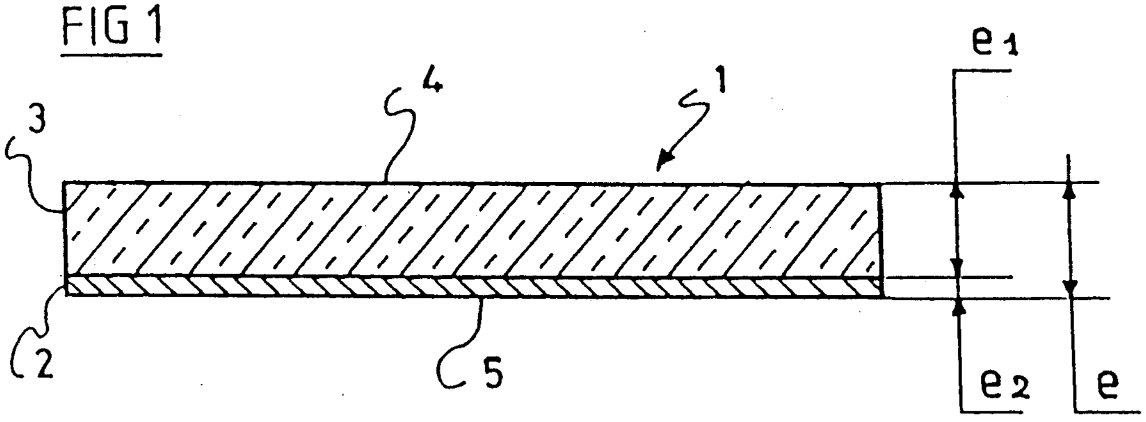
FIG. 1 is a cross-section of a bi-layer cover sheet before it is printed.

The process according to the present invention involves preparing a bi-layer plastic cover sheet in which one of the layers is constituted by an opaque pigmented material, and the other of the layers is substantially transparent and is superimposed in direct contact with the opaque contrast layer. Referring now to FIG. 1, reference numeral 1 designates a bi-layer cover sheet comprising substantially opaque lower contrast layer 2 and upper substantially transparent layer 3. Surfaces 4 and 5 are the respective upper and lower surfaces of bi-layer cover sheet 1.

In a non-limiting example selected to illustrate the process according to the invention, both contrast layer 2 and substantially transparent layer 3 are polyamides. The contrast layer is preferably white, and may be pigmented by means of titanium dioxide incorporated into the polyamide during the manufacture of the layer.

While a polyamide is the preferred material for bi-layer sheet 1, other types of materials can be used. Examples of suitable plastic materials are polycarbonates, Plexiglass, derivatives of polyamides, and sulfonated polyesters.

A large number of combinations of materials are thus available for forming the bi-layer sheet providing only that the materials are compatible with the manufacturing methods of extrusion/lamination which are necessary to obtain a bi-layer sheet. Thus, bi-layer cover sheet 1 may be composed of two plastic materials, which may be of the same or different and may be manufactured by co-extrusion, by extrusion of one of the materials on the other, by gluing two layers together, or by any other known means.

With reference to the contrast layer, which is to receive the motif or pattern, its color is not limited to the color white. The entire range of clear metallic, or pearly irridescent dyes may be utilized in preparing the contrast layer.

The plastic bi-layer made of a polyamide, such as shown in FIG. 1, has a thickness e which is the sum of the thickness $e_1$ of transparent layer 3 and the thickness $e_2$ of the contrast layer. The thickness $e_1$ is at least 0.1mm, but may range between about 0.5mm and 0.8mm. The preferable value of the thickness $e_1$ is about 0.6mm. The thickness $e_2$ preferably lies within the range of about 0.1mm and 0.3mm; and the preferred value of thickness $e_2$ is on the order of 0.2mm. The thickness $e_1$ of layer 3 is selected as a function of the transparency of the plastic material utilized in layer 3, the degree of protection, this layer is to provide, and the technical problems in manufacturing the bi-layers.

Within the context of the non-limiting example of performing the process of the present invention, the values of thicknesses of the layers should be considered as those offering the best technical results in the given example; but one of ordinary skill in the art could easily adapt these dimensions to a particular application to which the invention is to be put.

When the material of bi-layer sheet 1 is a polyamide, the thickness of $e_2$ of the contrast layer is defined such that it is less than the limiting migration value of the sublimable coloring agents within the polyamide under optimum transfer conditions of sublimation. A suitable example is provided by operating under the following conditions: temperature T of approximately 160° C., pressure p of approximately 1 bar, and time t of approximately 3 minutes. In this case, the limiting value of migration of the coloring agents in the polyamide is on the order of about 0.3mm.

One of the essential characteristics of the present invention is that the thickness $e_2$ of the opaque layer is less than this limiting value of migration. The value is thus definable for practically any plastic material that can be used with knowledge of the limiting value of migration for given sublimation operating conditions. The determination of this thickness, knowing the sublimation operating conditions, is clearly within the skill of one of ordinary skill in the art.

Figure 2:
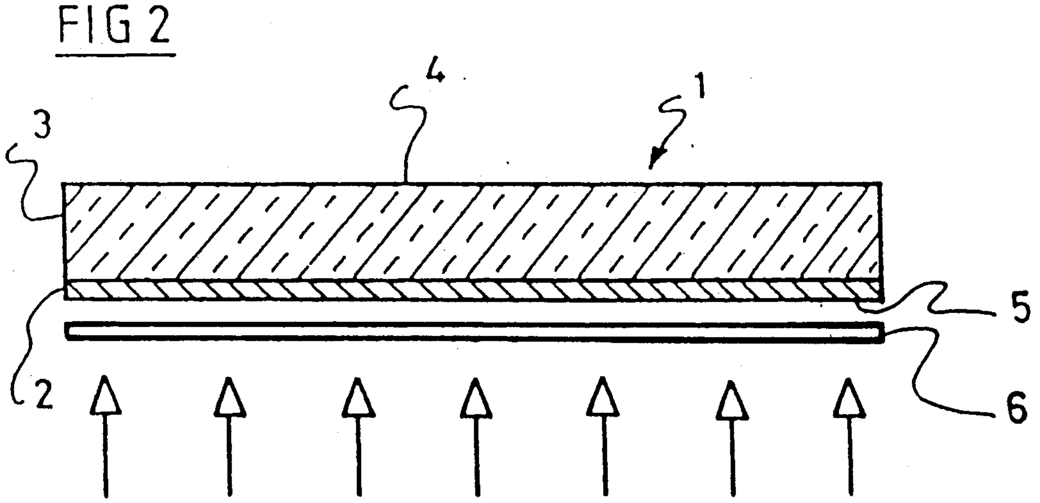
FIG. 2 is a view of the cover sheet shown in FIG. 1 showing a sublimation printing operation according to the invention.

FIG. 2 illustrates the printing phase of the present invention utilizing the transfer of sublimable coloring agents in the bi-layer plastic sheet According to an essential characteristic of the process of the present invention, support paper 6, comprising sublimable inks or coloring agents defining the printing motif or pattern, is applied to lower surface 5 of contrast layer 2. The sublimation operation itself, which is conventional, may then be carried out. That is to say, support paper 6 is subjected to a pressure p and to a temperature T for a time t. The coloring agents (organic components) affixed to the paper pass from the solid state to the gaseous state and thus penetrate into opaque layer 2 of bi-layer 1. The proper selection of the parameters p, T and t, causes the migration front of the coloring agent to pass beyond the interface between layers 2 and 3 and enter layer 3. During cooling, the coloring agents in the gaseous phase condense within bi-layer 1 and solidify thus reproducing the motif or pattern that gas initially present on the paper. As indicated above, the depth of penetration of the coloring agent into the material is dependent on the pressure, duration and temperature of the transfer, but the limit of penetration is also affected by the resistance of the material of bi-layer 1 to the temperature, and by the quality of the sublimable inks being utilized.

Migration of of a given color to a given depth does not occur in a homogenous manner. In effect, the migration front leaves a trail behind it which does not interfere with the clarity of the image reproduced. Finally, the decorative motif exists in all planes parallel to the surface on which the support paper has been applied. That is to say, the decorative motif is contained between the surface to which the carrier sheet has been applied and the limiting migration front of the inks in the material for a given sublimation.

The reaction conditions are a function of the materials being utilized. Operation may be under the following conditions: temperature T in the range of about 130° C. to 300° C.; pressure p in the range of about 1.3 bars and 6 bars; and time t in the ranger from a few seconds to a few minutes.

Figure 3:
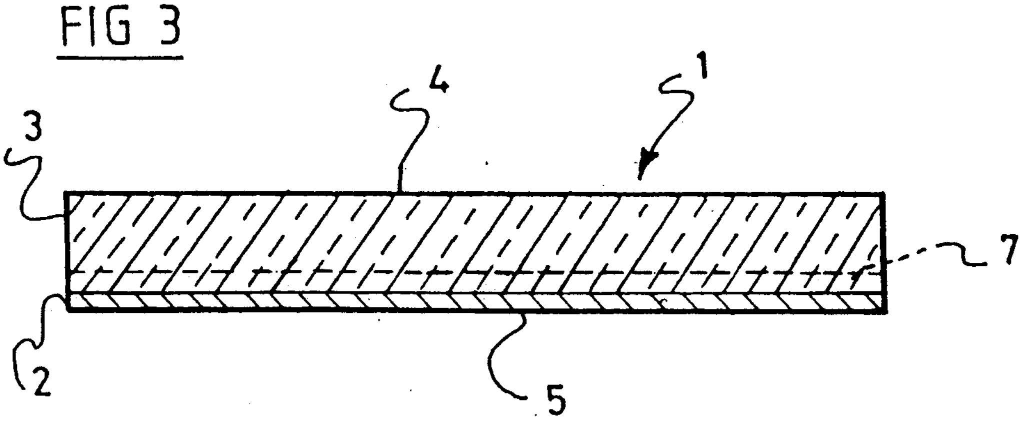
FIG. 3 is a view of the sheet shown in FIG. 1 after it has been printed.

As seen in FIG. 3, limiting plane 7 of the migration front of the coloring agents, extends beyond the upper level of the thickness $e_2$ of contrast layer 2. Plane 7, which includes the image, is thus positioned within and in the lower portion of transparent layer 3 close to layer 2 which is pigmented and of a contrasting color. The image is seen by an observer viewing an article through the transparent layer.

The first consequence of the technique for performing the process according to the invention is that the printed image appears clearly and sharply good intensity and color quality through transparent layer 3. In the preferred example of performing the process according to the present invention, limiting migration front 7, defining the image and constitutes by the ink which has migrated, is localized at approximately 0.33mm from lower surface 5, or about 0.5mm from the upper surface which protects the printed motif from deterioration caused by external agents. The transparent protection layer assures the durability of the impression for articles whose use involves contact of the decorated surfaces with various wear factors.

While the thickness $e_1$, of transparent layer 3 is shown and described as being greater than the thickness $e_2$ of contrast layer 2, certain conditions may dictate a reversal of this relationship. In such case $e_2$ would exceed $e_1$.

In a purely hypothetical situation where transparent protection layer 3 has been eroded by wear factors until the migration front of the coloring agents is exposed, the motif would still remain visible. This is the case because, as previously noted, the image is present in all of the planes below migration limiting front 7. Thus, the advantages provided by the process according to the present invention are made clear.

Figure 4:
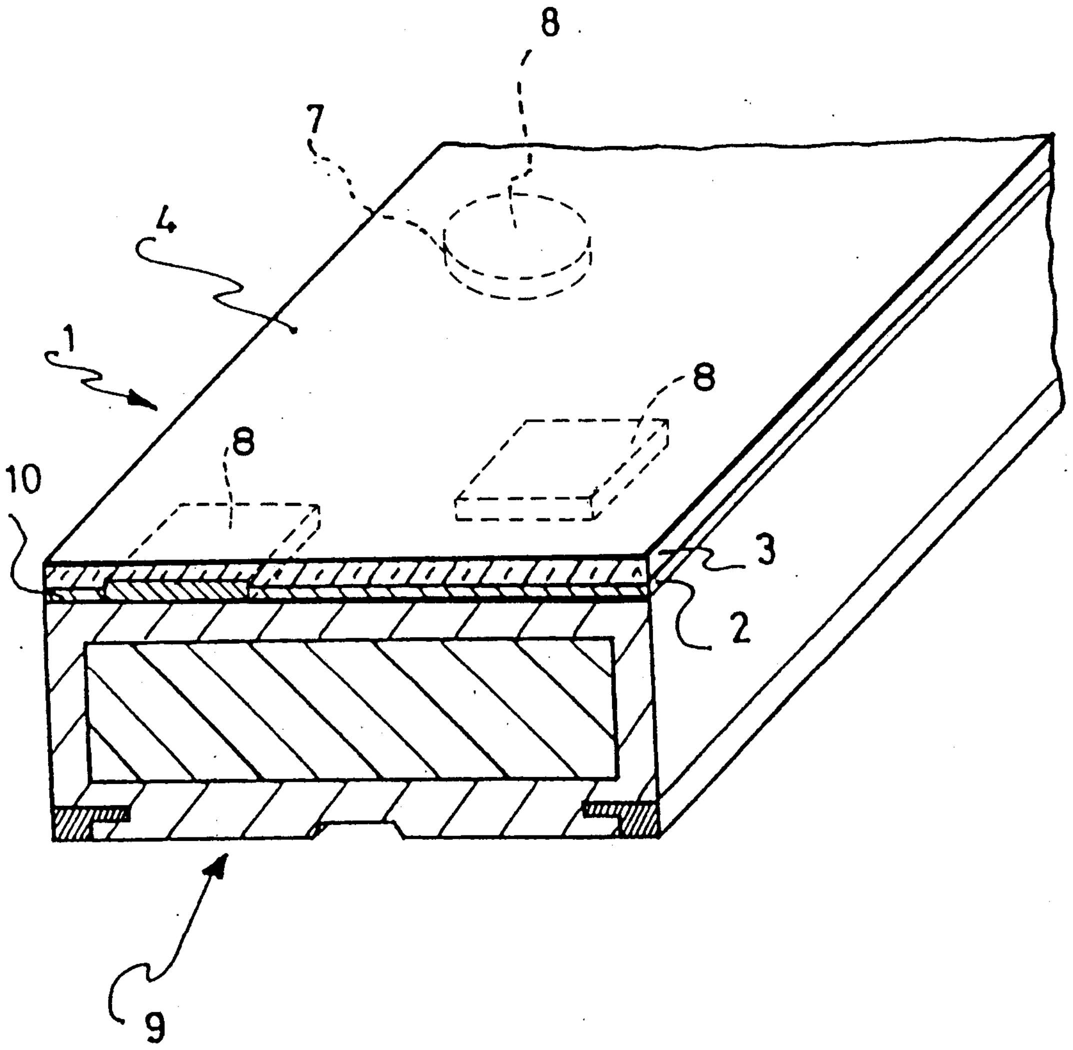
FIG. 4 is a non-limiting example of the application of the process according to the invention to the upper surfaces of a ski which is shown in perspective and in cross-section.

The last phase of the present invention is shown by way of example in FIG. 4. Various articles may be decorated by utilizing the process described above, and in particular, FIG. 4, which shows ski 9 decorated according to the present invention. According to the invention, bi-layer plastic sheet 1, printed in accordance with the sublimation process described above, can be applied to the top of ski 9 so that transparent layer 3 of the bi-layer forms the upper surface of the ski. Lower surface 5 of bi-layer 1 is bonded to surface 10 of the partial structure of ski 9 by appropriate means, for example, using a glue comprising organic solvents, or a thermo-hardening glue such as epoxy or polyurethane, or a thermo-fusible glue. The technique by which bonding of bi-layer 1 to the ski is effected may have a deleterious influence on the inks or coloring agents present in the lower surface or in the region adjacent to lower surface 5 of the bi-layer. The influence is on those sublimable coloring agents present in the trail behind the migration front which have not or have only very slightly migrated. The consequences of this may be a diffusion of the inks in contrast layer 2, the impetus for this diffusion being the heat generated by bonding which causes a further sublimation process and thus a further migration of the inks. The diffusion may also be the result of the presence of organic solvents which act on the coloring agents by dissolving them. The ink affected by this phenomenon, which by its relative position defines a precise decorative motif, will then diffuse into the material in a totally disordered fashion. Within the framework of the process in the invention, this may seriously damage the quality of the decorative motif. In effect, according to the process of the present invention, the quality of the decoration is protected by contrast layer 2 which separates the migration front seen by an observer from surface 5 of this layer which is in contact with the gluing agents. Moreover, the color of contrast layer 2 reduces the effect of possible diffusion of the inks and thus the alteration in the quality of the printing. Thus, the opacity of layer 2 tones down any diffusion beneath the plane containing colored image 8.

The particular characteristic of bi-layer 1 utilized in the process according to the present invention illustrates an interesting technical result. The present process makes it possible to achieve a significant reduction in the number of manufacturing operations, and in the amount of material necessary for putting the operation into effect, thereby reducing the cost of manufacturing and increasing the possibilities of easily changing the motif. Obviously, there is no limitation on the number of colors that can be used on the quality of the images produced, and on the maintenance of the quality of the image in time and with use.

It is clear that the article obtained, in this case a ski, has the technical decorative characteristics adapted to the process according to the present invention, and this without any limitation relating to the structure or composition of the ski itself. Furthermore, one of ordinary skill in the art is able to achieve the process described herein by utilizing other materials than those cited, by example in the present application, or by putting into effect equivalent means without going beyond the scope of the present invention.

Finally, although the invention has been described with reference to particular means, materials, and embodiments, the invention is not limited to the particulars disclosed and extends to all equivalents within the scope of the appended claims.

We claim:

1. A process for decorating an article using a sublimation printing process comprising the steps of:
   a) preparing a cover sheet having at least two integral superposed layers of plastic material, one of which is substantially transparent and has a thickness $e_1$, and the other which is opaque and has a thickness $e_2$;
   b) preparing a carrier sheet carrying a motif in the form of sublimable coloring agents;
   c) applying the carrier sheet to the opaque layer of the cover sheet;
   d) effecting a sublimation transfer of the motif on the carrier sheet to the opaque layer side of the cover sheet under conditions of temperature, pressure, and time duration such that the coloring agents migrate into the opaque layer; and
   e) applying the opaque layer side of the cover sheet to the article.

2. A process according to claim 1 wherein the step of effecting sublimation transfer of the coloring agents is such that the coloring agents migrate into the substantially transparent layer having a limiting migration value.

3. A process according to claim 2 wherein $e_2$ is less than the limiting migration value of the coloring agents in the cover sheet.

4. A process according to claim 1 wherein $e_1$ is greater than $e_2$.

5. A process according to claim 2 wherein $e_1$ is greater than $e_2$.

6. A process according to claim 2 wherein $e_1$ is less than $e_2$.

7. A process according to claim 2 wherein $e_1$ is less than $e_2$.

8. A process according to claim 1 wherein the substantially opaque layer is a polyamide.

9. A process according to claim 8 wherein the polyamide is colored white.

10. A process according to claim 2 wherein the substantially opaque layer is a polyamide.

11. A process according to claim 10 wherein the polyamide is colored white.

12. A process according to claim 3 wherein the substantially opaque layer is a polyamide.

13. A process according to claim 12 wherein the polyamide is colored white.

14. A process according to claim 14 wherein the substantially opaque layer is a polyamide.

15. A process according to claim 14 wherein the polyamide is colored white.

16. A process according to claim 1 wherein the temperature is in the range of approximately 130° C. to 300° C., the pressure is in the range of approximately 0.3 bar to 6 bar, and the time is in the range from a few seconds to a few minutes.

17. A process according to claim 2 wherein the temperature is in the range of approximately 130° C. to 300° C., the pressure is in the range of approximately 0.3 bar to 6 bar, and time is in the range from a few seconds to a few minutes.

18. A process according to claim 4 wherein the temperature is in the range of approximately 130° C. to 300° C., the pressure is in the range of approximately 0.3 bar to 6 bar, and time is in the range from a few seconds to a few minutes.

19. A process according to claim 14 wherein the temperature is in the range of approximately 130° C. to 300° C., the pressure is in the range of approximately 0.3 bar to 6 bar, and time is in the range from a few seconds to a few minutes.

20. A process according to claim 15 wherein the temperature is in the range of approximately 130° C. to 300° C., the pressure is in the range of approximately 0.3 bar to 6 bar, and time is in the range from a few seconds to a few minutes.

21. A process according to claim 1 wherein the substantially transparent layer is a polyamide.

22. A process according to claim 2 wherein the substantially transparent layer is a polyamide.

23. A process according to claim 4 wherein the substantially transparent layer is a polyamide.

24. A process according to claim 14 wherein the substantially transparent layer is a polyamide.

25. A process according to claim 16 wherein the substantially transparent layer is a polyamide.

26. A process according to claim 21 wherein the temperature is approximately 160° C., the pressure is approximately 1 bar, and the time is approximately three minutes.

27. A process according to claim 22 wherein the temperature is approximately 160° C., the pressure is approximately 1 bar, and the time is approximately three minutes.

28. A process according to claim 23 wherein the temperature is approximately 160° C., the pressure is approximately 1 bar, and the time is approximately three minutes.

29. A process according to claim 24 wherein the temperature is approximately 160° C., the pressure is approximately 1 bar, and the time is approximately three minutes.

30. A process according to claim 25 wherein the temperature is approximately 160° C., the pressure is approximately 1 bar, and the time is approximately three minutes.

31. A process according to claim 1 wherein $e_2$ is in the range of approximately 0.1mm to 0.3mm, and $e_1$ is in the range of approximately 0.5mm to 0.8mm.

32. A process according to claim 31 wherein $e_2$ is in the range of approximately 0.1mm to 0.3mm, and $e_1$ is in the range of approximately 0.5mm to 0.8mm.

33. A process according to claim 4 wherein $e_2$ is in the range of approximately 0.1mm to 0.3mm, and $e_1$ is in the of approximately 0.5mm to 0.8mm.

34. A process according to claim 14 wherein $e_2$ is in the range of approximately 0.1mm to 0.3mm, and $e_1$ is in the range of approximately 0.5mm to 0.8mm.

35. A process according to claim 16 wherein $e_2$ is in the range of approximately 0.1mm to 0.3mm, and $e_1$ is in the range of approximately 0.5mm to 0.8mm.

36. A process according to claim 1 wherein the article is a non-textile article. ios a 37. A process according to claim 2 wherein the article is a non-textile article.

38. A process according to claim 4 wherein the article is a non-textile article.

39. A process according to claim 14 wherein the article is a non-textile article.

40. A process according to claim 16 wherein the article is a on-textile article.

41. A process according to claim 1 wherein the article is the ski.

* * * * *

UNITED STATES PATENT AND TRADEMARK OFFICE

CERTIFICATE OF CORRECTION

PATENT NO. : 5,032,139

DATED : July 16, 1991

INVENTOR(S) : G. RECHER et al.

It is certified that error appears in the above-identified patent and that said Letters Patent is hereby corrected as shown below:

The title page, indicating that there are "4 Drawing Sheets", should be deleted and substitute therefor the attached title page, indicating that there are --2 Drawing Sheets--.

At column 3, line 63 of the printed patent, insert ---1.----after "sheet".

At column 4, line 11 of the printed patent, change "gas" to ---was---.

At column 4, line 19 of the printed patent, delete one of the two occurrences of ---of--- after "Migration".

At column 4, line 33 of the printed patent, change "ranger" to ---range---.

At column 4, line 45 of the printed patent, insert ---with--- after "sharply".

At column 5, line 51 of the printed patent, delete --- ---- after "images".

At column 8, line 23 (claim 36, line 2) of the printed patent, delete ---ios a--- after "article.".

At column 8, line 31 (claim 40, line 2) of the printed patent, change "on-textile" to ---non-textile---.

Signed and Sealed this

Sixth Day of April, 1993

Attest:

STEPHEN G. KUNIN

*Attesting Officer*

*Acting Commissioner of Patents and Trademarks*

United States Patent [19]

Recher et al.

[11] Patent Number: 5,032,139

[45] Date of Patent: Jul. 16, 1991

[54] PROCESS FOR DECORATING ARTICLES

[75] Inventors: Gilles Recher; Jean-Pierre Nurit, both of Annecy, France

[73] Assignee: Salomon, S.A., Annecy Cedex, France

[21] Appl. No.: 249,771

[22] Filed: Sep. 26, 1988

[30] Foreign Application Priority Data

Sep. 25, 1987 [FR] France ..... 87 13552

[51] Int. Cl.[5] ..... B29B 11/00

[52] U.S. Cl. ..... 8/471; 156/249; 428/203

[58] Field of Search ..... 8/471, 467, 468; 156/71, 99, 100, 230, 240, 235, 237, 249, 298; 428/40, 46, 203, 204, 205, 352, 354, 343, 412, 287; 52/171; 264/79

[56] References Cited

U.S. PATENT DOCUMENTS

| | | | |
|---|---|---|---|
| 3,897,587 | 7/1975 | Molner | 156/235 |
| 3,952,131 | 4/1976 | Sideman | 156/240 |
| 4,059,471 | 11/1977 | Haigh | 428/204 |
| 4,284,456 | 8/1981 | Hare | 156/235 |
| 4,395,263 | 7/1983 | Davis | 8/471 |
| 4,673,609 | 6/1987 | Hill | 52/171 |
| 4,824,722 | 4/1989 | Jarrett | 428/287 |

FOREIGN PATENT DOCUMENTS

| | | |
|---|---|---|
| 1944905 | 5/1971 | Fed. Rep. of Germany . |
| 2387793 | 11/1978 | France . |
| 2457777 | 12/1980 | France . |
| 2000730 | 1/1979 | United Kingdom . |

*Primary Examiner*—2
*Assistant Examiner*—Louis Falasco
*Attorney, Agent, or Firm*—Sandler, Greenblum & Bernstein

[57] ABSTRACT

A process for decorating an article using a sublimation process includes the step of preparing a cover sheet having at least two superposed layers of plastic material, one of which is substantially transparent and the other which is opaque. A carrier sheet is prepared carrying a motif in the form of sublimable coloring agents. The carrier sheet is applied to the opaque layer of the cover sheet and a sublimation transfer process is effected by which the motif in the carrier sheet is transferred to the opaque layer of the cover sheet such that the coloring agents migrate into and beyond the opaque layer. Finally, the process involves applying the cover sheet to the article such that the opaque side of the cover sheet faces the article so that an observer views the motif through the transparent layer.

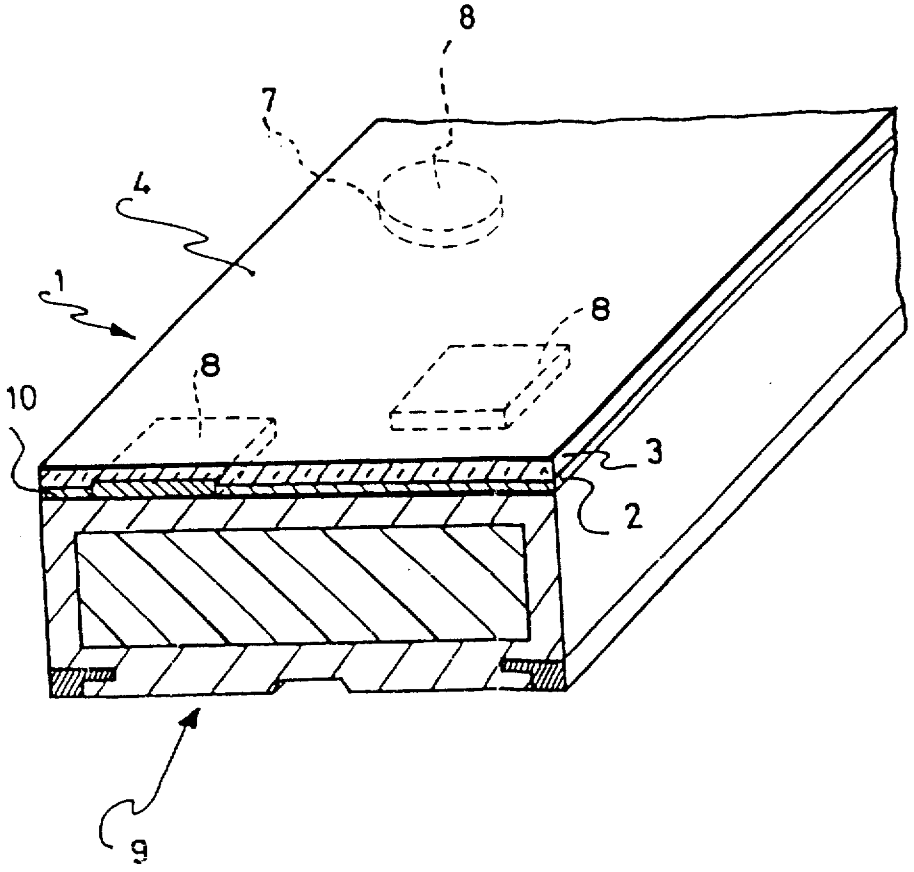

41 Claims, 2 Drawing Sheets